United States Patent
Sonoda et al.

(10) Patent No.: US 6,837,040 B2
(45) Date of Patent: Jan. 4, 2005

(54) IN-CYLINDER INJECTION TYPE SPARK-IGNITION INTERNAL COMBUSTION ENGINE AND CONTROL METHOD THEREOF

(75) Inventors: Yukihiro Sonoda, Sunto-gun (JP); Yasuyuki Irisawa, Susono (JP); Takashi Tsunooka, Susono (JP); Koichi Kitaura, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/373,804

(22) Filed: Feb. 27, 2003

(65) Prior Publication Data

US 2003/0182931 A1 Oct. 2, 2003

(30) Foreign Application Priority Data

Mar. 27, 2002 (JP) ........................................ 2002-089509

(51) Int. Cl.[7] .................................................. F01N 3/00
(52) U.S. Cl. .............................. 60/284; 60/274; 60/285; 123/90.15; 123/295
(58) Field of Search .......................... 60/274, 276, 284, 60/285; 123/90.11, 90.15, 90.16, 90.17, 295

(56) References Cited

U.S. PATENT DOCUMENTS

| | | | |
|---|---|---|---|
| 5,398,502 | A | 3/1995 | Watanabe |
| 6,041,591 | A * | 3/2000 | Kaneko et al. ................ 60/274 |
| 6,055,948 | A * | 5/2000 | Shiraishi et al. ......... 123/90.15 |
| 6,266,957 | B1 | 7/2001 | Nozawa et al. |
| 6,334,417 | B1 | 1/2002 | Salber et al. |
| 6,343,578 | B1 | 2/2002 | Kerkau et al. |
| 6,345,499 | B1 | 2/2002 | Nishimura et al. |
| 6,438,943 | B1 * | 8/2002 | Yamamoto et al. ........... 60/274 |
| 6,560,960 | B2 * | 5/2003 | Nishimura et al. ........... 60/284 |
| 6,681,741 | B2 * | 1/2004 | Majima et al. ............. 123/399 |
| 6,691,506 | B2 * | 2/2004 | Shimizu ....................... 60/284 |
| 2003/0116131 | A1 * | 6/2003 | Majima et al. ......... 123/406.53 |

FOREIGN PATENT DOCUMENTS

| | | |
|---|---|---|
| JP | A 9-41955 | 2/1997 |
| JP | A 11-324778 | 11/1999 |

* cited by examiner

*Primary Examiner*—Tu M. Nguyen
(74) *Attorney, Agent, or Firm*—Oliff & Berridge, PLC

(57) ABSTRACT

An in-cylinder injection type spark-ignition internal combustion engine and a control method thereof realize a stabilized stratified-charge combustion by setting a large lift amount to an intake valve when the engine is cold-started and by executing a compression stroke injection. At this time, warming-up capability of a catalyst is improved by delaying an ignition timing.

11 Claims, 4 Drawing Sheets

US 6,837,040 B2

IN-CYLINDER INJECTION TYPE SPARK-IGNITION INTERNAL COMBUSTION ENGINE AND CONTROL METHOD THEREOF

INCORPORATION BY REFERENCE

The disclosure of Japanese Patent Application No. 2002-089509 filed on Mar. 27, 2002 including the specification, drawings and abstract is incorporated herein by reference in its entirety.

BACKGROUND OF THE INVENTION

1. Field of Invention

The invention relates to an in-cylinder injection type spark-ignition internal combustion engine in which a fuel directly injected into a cylinder is combusted using a spark plug. In particular, the invention relates to stabilizing the combustion when the engine is cold-started.

2. Description of Related Art

In recent years, an in-cylinder injection type gasoline engine that has realized lean burning has become widely used. Japanese Patent Laid-Open Publication No. 11-324778 describes an example of such technology. The technology described in the publication is configured so that an intake valve opens when the crank angle has passed a predetermined angle after the exhaust valve is closed to prevent concurrent oil dilution and smoking at the time of cold starting. Furthermore, the technology described in the publication is designed so that a fuel is injected while both valves are closed. As mentioned above, the technology described in the publication prevents the time period where the exhaust valve opens and the time period where the intake valve opens from being overlapped. Accordingly, a part of high temperature combustion gas is allowed to remain in the combustion chamber. Moreover, a fuel is injected into the combustion chamber in which a part of the high temperature combustion gas remains, and thus the fuel atomization is accelerated. It is mentioned in the publication that the above configuration can inhibit fuel from being adhered to a piston crown surface or to a cylinder bore wall surface, and thus it can inhibit both the smoking and oil dilution.

However in the above mentioned technology, fuel is injected at an early timing of the intake stroke when the engine is cold-started. Thus, homogeneous air-fuel mixture is essentially formed to cause stratified charge combustion. Therefore, the technology cannot realize a lean burning using a stratified charge combustion, and accordingly decreases fuel efficiency.

SUMMARY OF THE INVENTION

It is therefore one object of the invention to provide an in-cylinder injection type spark-ignition internal combustion engine which can generate a stratified-charge combustion at cold starting and thus realize improved fuel efficiency.

To achieve the aforementioned and/or other objects, an in-cylinder injection type spark-ignition internal combustion engine according to one aspect of the invention is provided with an injector for injecting a fuel into the cylinder, an ignition plug for combusting the fuel injected into the cylinder, an intake valve provided in the internal combustion engine, a lift mechanism for changing a lift amount of the intake valve, and a controller for setting the lift amount of the intake valve large when the engine is cold-started using the lift mechanism, and injecting a fuel from the injector in a compression stroke, and at the same time, delaying the ignition timing of the ignition plug to operate the internal combustion engine by a stratified-charge combustion. Furthermore, a controlling method of the internal combustion engine includes a step of determining whether the internal combustion engine is cold-started, and a step of setting a large lift amount to the intake valve of the internal combustion if the engine is determined to be cold-started and then injecting a fuel in a compression stroke to delay the ignition timing of the internal combustion engine.

BRIEF DESCRIPTION OF THE DRAWINGS

The invention will be described with reference to the accompanying drawings of exemplary embodiments, in which.

DETAILED DESCRIPTION OF PREFERRED EMBODIMENTS

Figure 1:
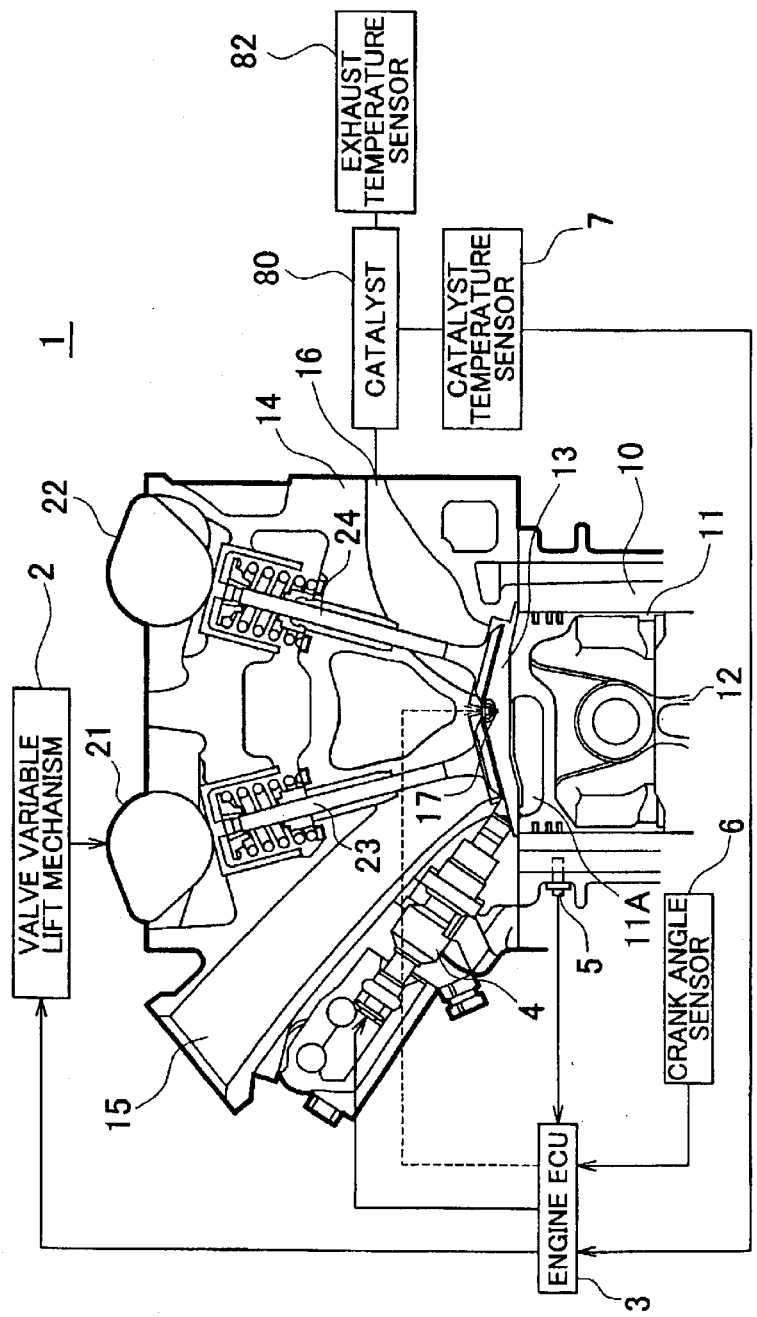
FIG. 1 is a schematic structural drawing showing an in-cylinder injection type spark-ignition internal combustion engine according to an exemplary embodiment of the invention.

Hereafter, a preferred embodiment of the invention will be described with reference to the attached drawings. To make the description easier to understand, the same structural elements in each drawing are referred to by the same reference numerals as possible, and any redundant explanation will be omitted.

FIG. 1 is a schematic structural drawing showing an in-cylinder injection type spark-ignition internal combustion engine according to an exemplary embodiment of the invention. This internal combustion engine 1 is a gasoline engine of a type in which gasoline as a direct fuel is injected into a combustion chamber 13 by a high-pressure injector 4, and ignited and combusted by an ignition plug 17.

A piston head 11 is disposed in a cylinder 10 of the engine so that the piston head 11 can reciprocate in the vertical direction of the drawing. The piston head 11 is connected to a crank shaft, not shown in the drawing, with a connecting rod 12 which converts the reciprocating motion of the piston head 11 into a rotary motion. A cavity 11A is formed on the upper part (the crown surface) of the piston head 11. The space between the crown surface of the piston head 11 and a cylinder head 14 forms the combustion chamber 13.

On a portion of the cylinder head 14, facing the combustion chamber 13, the injector 4, an intake valve 23, an exhaust valve 24, and the ignition plug 17 are disposed. The injector 4 is disposed in the direction where a fuel can be injected to the cavity 11A of the piston head 11. Furthermore, the ignition plug 17 is disposed between the intake valve 23 and the exhaust valve 24 and near the edge of the cavity 11A which is opposite to the injector 4 side. The intake valve 23 is disposed between the combustion chamber 13 and an intake pipe 15, and the exhaust valve 24 is disposed between the combustion chamber 13 and an exhaust pipe 16. Both valves 23 and 24 are driven by cams 21 and 22, respectively. The intake cam 21 has a cross section with a varied cam profile in the rotation axis direction, as is well known. The portion (in the rotation axis direction) of the profile that is used can be controlled by movement of the intake cam 21 in the rotation axis direction by a valve variable lift mechanism 2.

The operation of the internal combustion engine 1 is controlled by an engine ECU 3. Into the engine ECU 3, output data from a water temperature sensor 5, a crank angle sensor 6, a catalyst temperature sensor 7, and the like are input so as to control the operations of the valve variable lift mechanism 2, the injector 4 and the ignition plug 17. The water temperature 5 measures the engine cooling water temperature, and the crank angle sensor 6 measures the crank angle. Further, the catalyst temperature sensor 7 measures the temperature of the exhaust emission purifying catalyst 80.

Figure 2:
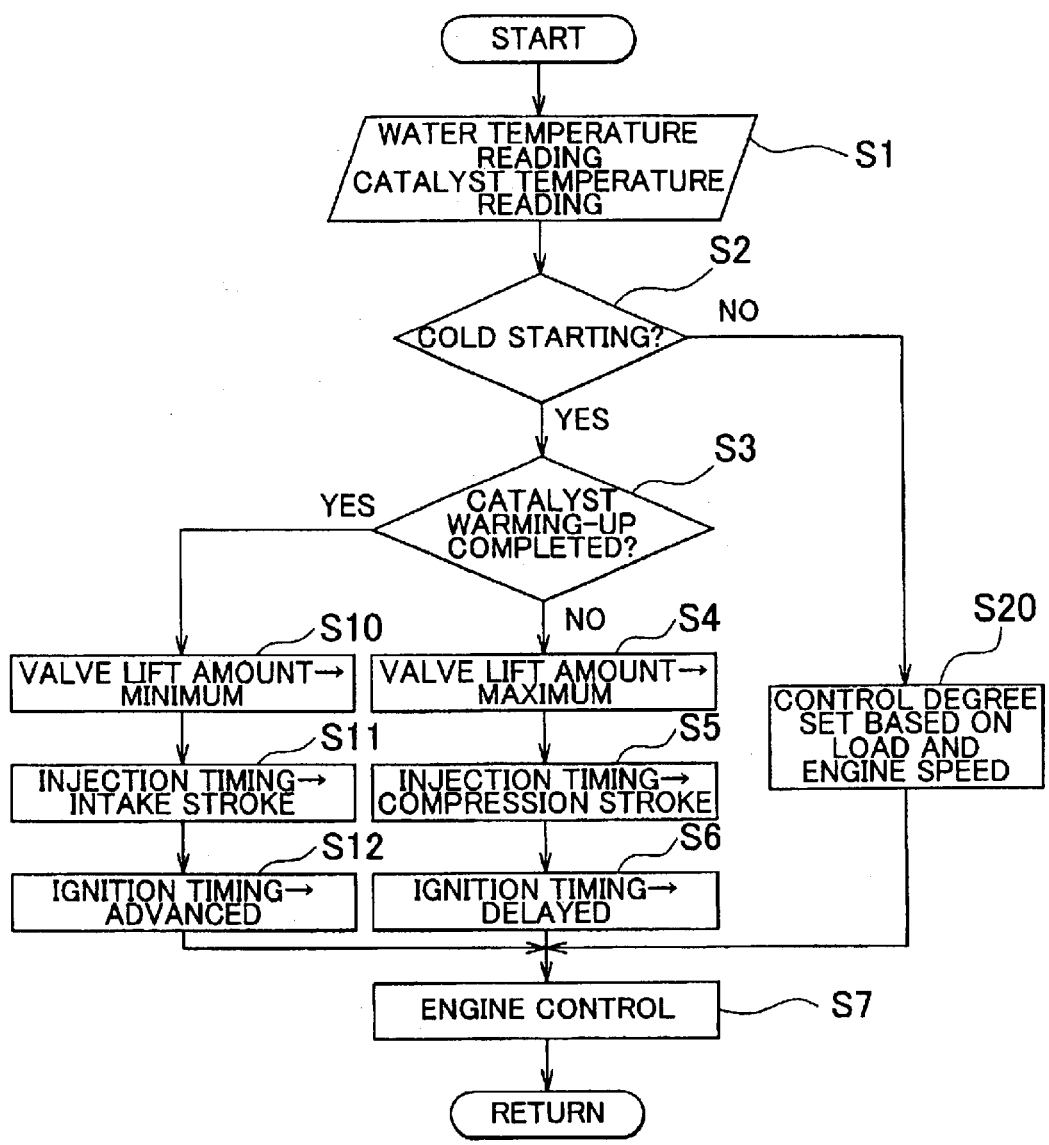
FIG. 2 is a flowchart showing a first control process in the device shown in FIG. 1 when the engine is cold-started.
Figure 3:
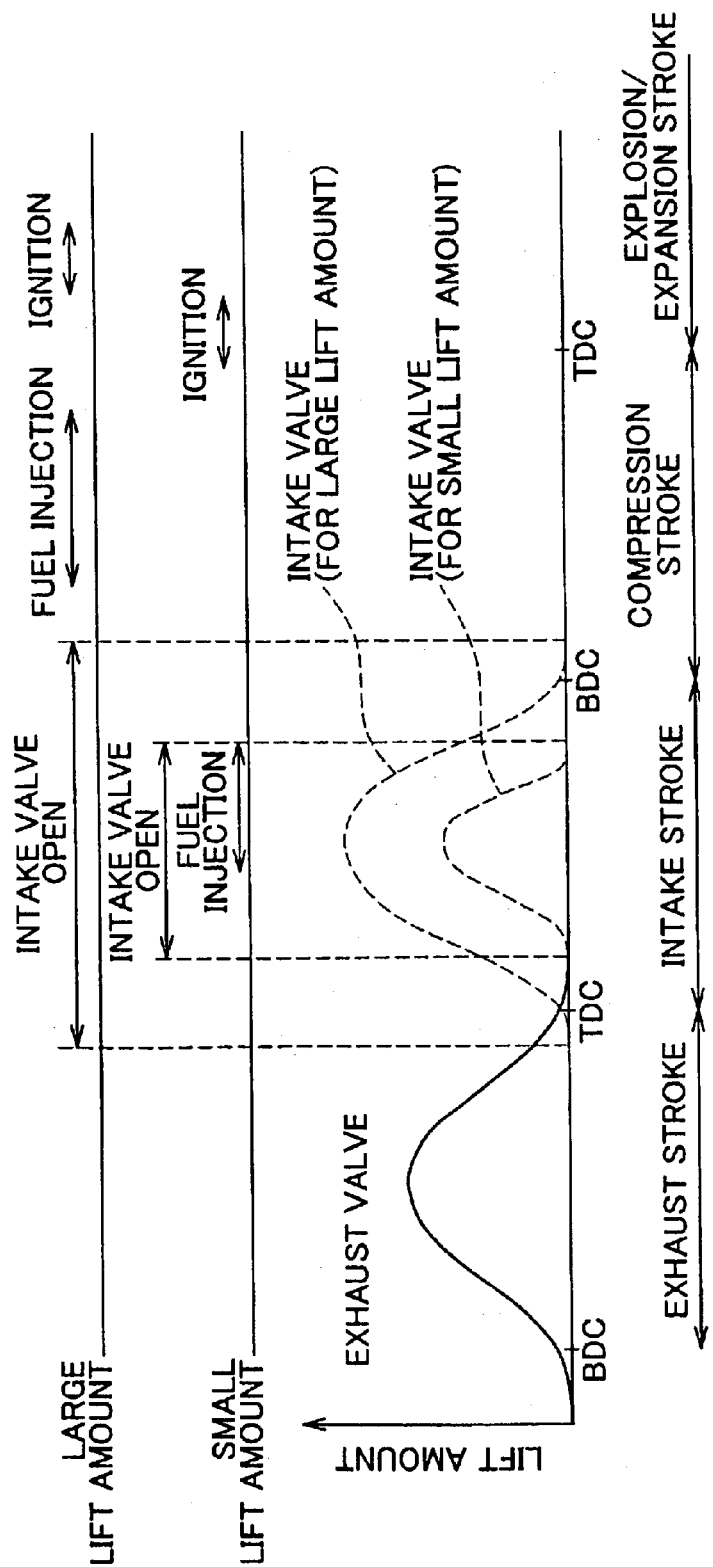
FIG. 3 is a time chart showing the valve timings or the like shown in time-series, in the internal combustion engine shown in FIG. 1.

A control process that occurs when the internal combustion engine is started will be specifically described with reference to FIG. 2 and FIG. 3. FIG. 2 is a flow chart showing the control processing. FIG. 3 is a chart showing in time-series the lift amounts of the intake valve 23 and the exhaust valve 24, a fuel injection from the injector 4, and an ignition operation of the ignition plug 17. This control process is executed by the engine ECU 3.

As shown in FIG. 2, first, in step S1, the engine ECU 3 reads the water temperature and catalyst temperature based on the outputs from each of the water sensor 5 and the catalyst temperature sensor 7, respectively. In step S2, the engine ECU 3 determines whether the engine is cold-started. Specifically, the engine ECU 3 determines the engine to be cold-started when the water temperature is a threshold value (5° C., for example) or lower, and the elapsed time from the engine start is a threshold value (several minutes, for example) or shorter.

If the engine ECU 3 judges the engine to be cold-started, the control proceeds to step S3. In step S3, the engine ECU 3 determines whether a catalyst warming-up has been completed based on the catalyst temperature. The engine ECU may judge the completion of the catalyst warming-up when the catalyst reaches a threshold value (400° C., for example) or higher.

If the catalyst temperature is lower than the threshold value and the warming-up is not yet completed, in other words, if not much time has passed since the engine started, the control proceeds to step S4. The engine ECU 3 sets the valve lift amount to the maximum value (step S4), sets the fuel injection timing to the compression stroke (step S5), and then delays the ignition timing (step S6). After that, the control proceeds to step S7 where the engine ECU 3 controls the operation of the internal combustion engine 1 so that the engine control amount becomes one that has been set according to the crank angle (the position of the piston head 11) based on the output value of the crank angel sensor 6.

When the catalyst temperature exceeds the threshold value and the warming-up has been completed, in other words, a sufficient time has passed since the engine started, the control proceeds to step S10. The engine ECU 3 sets the valve lift amount to the minimum value (step S10), sets the fuel injection timing to the intake stroke (step S11), and then advances the ignition timing (step S12). After that, the engine ECU 3 proceeds to step S7 and controls the operation of the internal combustion engine 1 so that the engine control amount becomes one that has been set according to the position of the piston head 11.

On the contrary, if it is determined in step S2 that the engine is not cold-started, the control proceeds to step S20. In step S20, the engine ECU 3 determines each engine control amount such as valve lift, combustion timing, ignition timing and the like based on the load and the engine speed. After those values have been set, the control proceeds to step S7 where the engine ECU 3 controls the operation of the internal combustion engine 1 based on the control amount that has been set according to the position of the piston head 11.

As a result of this control process, the intake valve 23 opens immediately after the engine has cold-started, so as to have the maximum lift amount with some valve overlap with the exhaust valve 24, as shown in the large lift amount timing in FIG. 3. As a result, a large amount of air can be sucked into the combustion chamber 13 while suppressing the tumble component. Then, the injector 4 injects fuel in a compression stroke after the piston head 11 has reached the bottom dead center (BDC). Thus, the fuel is concentrated in the cavity 11A portion of the piston head 11 (more specifically, at an end of the cavity 11A closer to the center of the piston head 11), and an air-fuel mixture having a ratio close to the stoichiometric air-fuel ratio is intensively formed only in the vicinity of the ignition plug 17. Afterward, when the ignition plug 17 sparks after the piston head 11 has reached the top dead center (TDC), the fuel is ignited. Thus, a combustion is caused in the combustion chamber 13 (stratified-charge combustion). Because the combustion (stratified-charge combustion) is caused by a locally concentrated small amount of air-fuel mixture, a stabilized combustion can be achieved even when the engine water temperature is low. Furthermore, because the ignition timing is delayed, the fuel is not completely combusted. Instead, a part of the fuel is exhausted as HC, and the part of the fuel is combusted in the exhaust pipe 16 as a secondary combustion. Thus, the exhaust emission catalyst is heated, and its temperature increase up to the activation temperature is accelerated. As a result, HC and smoke in the actually exhausted emission are reduced, and thus the emission is improved. This inhibits the deterioration of driveability of the vehicle accompanied by misfire or the like.

When the engine is cold-started after the catalyst has been warmed up, as shown as the small lift timing in FIG. 3, the intake valve 23 opens so as to have the minimum lift amount after the exhaust valve 24 has closed. As a result, airflow turbulence is accelerated because strong tumble component is provided to the air sucked into the combustion chamber 13. Fuel is injected from the injector 4 into the airflow in the intake stroke until the piston head 11, during or immediately after an air intake, reaches the BDC. Thus, the fuel atomization is accelerated forming a substantially homogeneous air-fuel mixture. Afterward, the ignition plug 17 sparks at around a time when the piston head 11 reaches the TDC. Due to this, the fuel is ignited, and combustion is caused in the combustion chamber 13. Stabilized combustion is generated even in a state where the engine water temperature is not sufficiently high because the combustion is generated with the homogeneous air-fuel mixture being formed. In this case, the combustion duration time can be lengthened, and thus the exhaust temperature is inhibited from increasing, and emission deterioration is inhibited. Furthermore, the catalyst is inhibited from being overheated. Additionally, deterioration of driveability of the vehicle accompanied by misfire or the like can be inhibited. By controlling the engine in this way, both of the combustion stability and the improved fuel efficiency for cold starting are achieved.

After the engine has completed a cold starting, in other words, after the internal combustion engine 1 has completed the warming-up, the stratified-charge combustion (compression stroke injection) and the homogeneous combustion (intake stroke injection) are switched between each other according to the load and the engine speed.

As mentioned above, a stratified-charge combustion can be generated by injecting a fuel in a compression stroke and thus concentrating the fuel in the vicinity of the ignition plug. Furthermore, fuel is prevented from being adhered to the wall surface or the like because fuel is concentrated in a portion near the ignition plug. Additionally, tumble component is suppressed because a large lift amount is set to the intake valve. Therefore, an air-fuel mixture is stably formed at around the ignition timing, and thus the combustion is stably generated. Furthermore, an unburned HC is generated because the ignition timing is delayed, and thus the secondary combustion is accelerated. Therefore, the warm-up capability of the catalyst is improved. Accordingly, the exhaust emission deterioration is inhibited, and thus driveability of the vehicle is also inhibited from being deteriorated.

Furthermore, after the catalyst has been warmed up, a fuel is injected in the intake stroke, and thus a homogeneous combustion is generated inhibiting the HC from being generated and inhibiting smoking. In this case, a small lift amount is given to the intake valve, and thus the tumble component in the combustion chamber is strengthened. Therefore, homogeneous mixture of fuel and air is implemented and thus the combustion is stabilized. As a result, both combustion stability and improved fuel efficiency are achieved.

Figure 4:
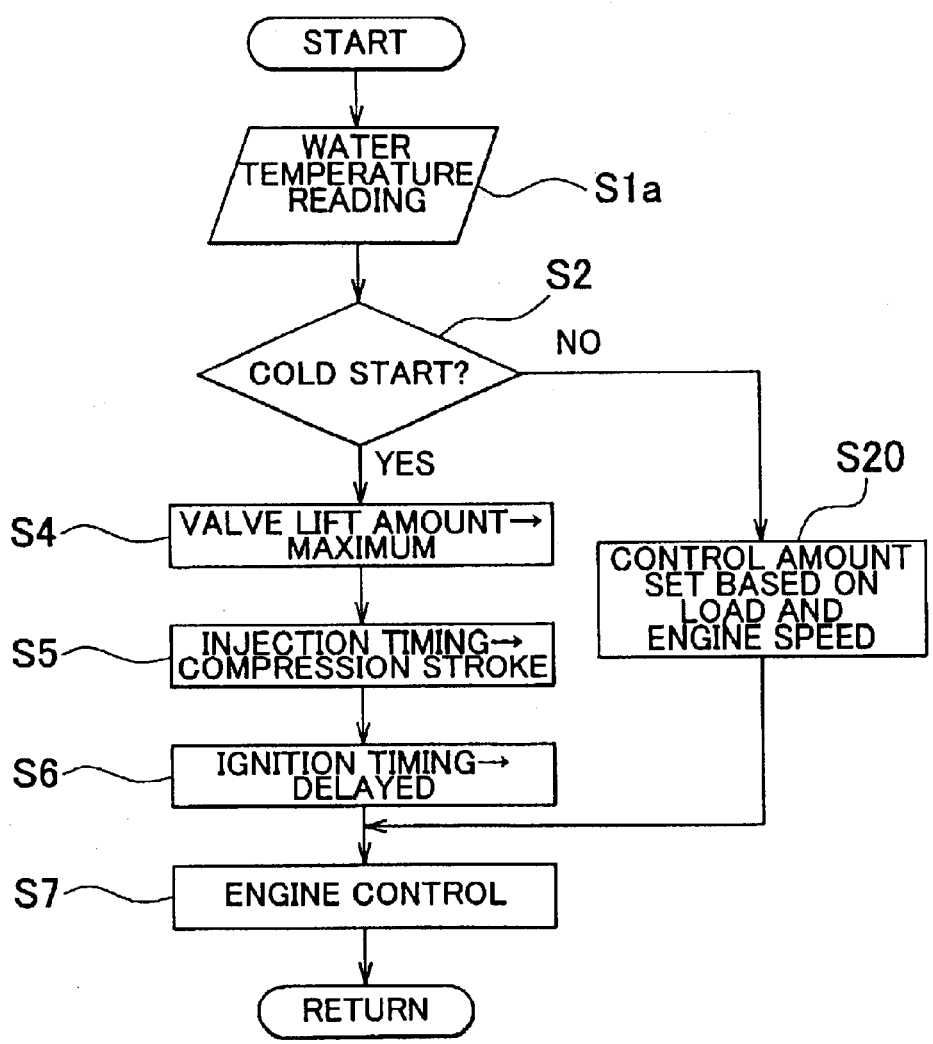
FIG. 4 is a modified version of the FIG. 2 control process.

A configuration for switching a control according to the catalyst temperature has been described above. However, only a stratified-charge combustion, in other words, only the compression stroke may be used as shown in the control process of FIG. 4. This control process substantially corresponds to the process shown in FIG. 2, excluding step S3 and steps S10 to 12. Step S1a is similar to FIG. 2 step S1, except that only the reading-out of the water temperature is executed.

An example in which a gasoline engine is employed has been described above. However, the fuel is not limited to gasoline but may be other liquid or gaseous fuels. Additionally, the invention can be applied to a multi-cylinder engine in the same way.

Moreover, regarding completion of catalyst warming-up, an example where a sensor for directly measuring the catalyst temperature has been described above. However, warming-up completion may be estimated, for example by the ECU 3, based on an estimated catalyst temperature, determined using an exhaust temperature sensor 82, a method of measuring exhaust temperature or the like, after the exhaust has passed the catalyst.

According to aspects of the invention, as described above, a large lift amount is set to the intake valve when the engine is cold-started, a fuel is injected in a compression stroke, and the ignition is delayed. Accordingly, the stability of stratified-charge combustion is improved and the catalyst warming-up capability is improved. Accordingly, the deterioration of emissions and driveability of the vehicle can be concurrently inhibited.

Additionally, after the catalyst has been warmed up, a small lift amount is set to the intake valve, and a fuel is injected in the intake stroke. Thus, the stability of the combustion is improved, the emission deterioration is inhibited, and the fuel efficiency can be improved.

The controller (e.g., the ECU 3) of the illustrated exemplary embodiments are implemented as one or more programmed general purpose computers. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller can be a plurality of separate dedicated or programmable integrated or other electronic circuits or devices (e.g., hardwired electronic or logic circuits such as discrete element circuits, or programmable logic devices such as PLDs, PLAs, PALs or the like). The controller can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controller. A distributed processing architecture can be used for maximum data/signal processing capability and speed.

While the invention has been described with reference to preferred exemplary embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more less or only a single element, are also within the spirit and scope of the invention.

What is claimed is:

1. A control method for an in-cylinder injection type spark-ignition internal combustion engine, comprising the steps of:

determining whether the internal combustion engine is cold-started; and if it is determined that the internal combustion engine is cold-started, setting a lift amount of an intake valve larger than a lift amount for hot start of the internal combustion engine, injecting fuel in a compression stroke, and delaying an ignition timing of the internal combustion engine.

2. The control method according to claim 1, further comprising the steps of:

determining a temperature of a catalyst of the internal combustion engine; and if it is determined that the catalyst temperature has reached or exceeded a predetermined temperature while the engine is cold-started, switching the fuel injection timing to an intake stroke, setting a lift amount of the intake valve smaller than a lift amount for cold start of the internal combustion engine, and advancing an ignition timing of the internal combustion engine.

3. The method according to claim 1, further comprising the step of:

if the engine is not being cold-started, setting at least any one of a valve lift amount, a combustion timing and an ignition timing of the internal combustion engine, based on at least one of a load of the internal combustion engine and an engine speed of the internal combustion engine.

4. The control method according to claim 1, wherein the cold-start is determined based on the cooling water temperature of the internal combustion engine.

5. An in-cylinder injection type spark-ignition internal combustion engine comprising:

an injector that injects a fuel into a cylinder;

an ignition plug that combusts the fuel that is injected into the cylinder;

an intake valve that is provided in the internal combustion engine;

a lift mechanism that variably changes a lift amount of the intake valve; and a controller that operates the internal combustion engine in stratified-charge combustion when the engine is cold-started, by setting a lift amount of the intake valve larger than a lift amount for hot-starting by the lift mechanism, by injecting the fuel in a compression stroke from the injector, and by delaying ignition timing of the ignition plug of the internal combustion engine.

6. The internal combustion engine according to claim 5, further comprising:

a water temperature sensor that measures a cooling water temperature of the internal combustion engine, wherein the controller determines that the internal combustion engine is cold-started if the cooling water temperature measured with the water temperature sensor is equal to or below a predetermined temperature, and at the same time, a time elapsed since the internal combustion engine is started is equal to or below a predetermined time period.

7. The internal combustion engine according to claim 5, wherein the internal combustion engine is a multi-cylinder engine.

8. The internal combustion engine according to claim 5, wherein when the lift amount of the intake valve is set to be cold-started, the opening timing of the intake valve overlaps with the opening timing of the exhaust valve.

9. The in-cylinder injection type spark-ignition internal combustion engine according to claim 5, further comprising:

a catalyst that purifies exhaust; and wherein the controller determines a temperature of the catalyst and operates the internal combustion engine in homogeneous combustion when the controller determines the temperature of the catalyst to have reached or exceeded a predetermined temperature after the cold-start, by switching a fuel injection timing of the internal combustion engine to an intake stroke, setting a lift amount of the intake valve smaller than a lift amount for cold-starting by the lift mechanism, and advancing the ignition timing of the internal combustion engine.

10. The internal combustion engine according to claim 9, further comprising:

a catalyst temperature sensor that measures a temperature of the catalyst, the controller determines the catalyst temperature from an output of the catalyst temperature sensor.

11. The internal combustion engine according to claim 9, further comprising:

an exhaust temperature sensor that measures a temperature of exhaust which has passed the catalyst, the controller estimates the catalyst temperature by estimating using an output of the exhaust temperature sensor.

\* \* \* \* \*